United States Patent Office 3,729,517
Patented Apr. 24, 1973

3,729,517
SYNTHESIS OF DIALKARYL SULFONE
William J. I. Bracke, Brussels, Belgium, assignor to Cosden Oil & Chemical Company, Big Spring, Tex.
No Drawing. Filed Nov. 9, 1970, Ser. No. 88,104
Int. Cl. C07c 147/01
U.S. Cl. 260—607 A
17 Claims

ABSTRACT OF THE DISCLOSURE

Dialkaryl sulfones are formed by treating the first stage alkaryl sulfonic acid with more alkaryl hydrocarbon in a second stage, the second stage reaction being initiated by $P_2O_5$, removing the water formed in the reaction by azeotropic distillation of some of the excess hydrocarbon from the reaction mixture as the sulfone is formed.

This invention relates to a synthesis of diaryl and dialkaryl sulfones in two stages wherein a first stage formed alkaryl sulfonic acid is converted in a second stage to the dialkaryl sulfone by reaction initiated with phosphoric anhydride.

The method involves a substantial economy over prior art methods of preparing diaryl sulfones in which the sulfone is usually formed by reaction of an excess of aromatic hydrocarbon with sulfuric acid, sometimes in the presence of aluminum chloride, phosphorous pentachloride or phosphorousoxychloride. The old reaction proceeds with relatively expensive materials and in generally low yields. It has also been proposed to use phosphoric anhydride in equimolar quantity to remove water. The present reaction proceeds readily with less expensive materials and in better yields or in comparatively lower quantity, a reaction which allows important economies.

The compounds formed herein have the formula:

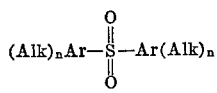

wherein Ar are the same or different aryl radicals selected from the group consisting of benzene, biphenyl, naphthalene, Tetralin, anthracene, benzophenone, biphenyl methane, phenanthrene and biphenylene oxide of which benzene is the most common. Alk is lower alkyl having 1 to 6 carbon atoms such as methyl, ethyl, propyl, isopropyl, butyl, n-amyl, isoamyl and n-hexyl, and $n$ is an integer of 0 to 3 where Ar is polycyclic, $n$ is preferably 1 or 2.

Typically useful aryl and alkaryl starting materials are benzene, toluene, ethylbenzene, o-, m- and p-xylenes, o-, m- and p-diethylbenzenes, n-butyl benzene, n-hexyl benzene, 1-methyl Tetralin, alphamethyl naphthalene, 1,2-dimethyl naphthalene, 2,3-dimethyl biphenyl, 1,4-dimethyl anthracene, 1-methyl phenanthrene, benzophenone, biphenyl methane, biphenylene oxide and the like.

In converting such benzene and alkaryl hydrocarbons to diphenyl or dialkaryl sulfones, according to the present invention, the alkaryl compound is first treated with concentrated sulfuric acid in a first step to convert it to a sulfonic acid. The excess unsulfonated hydrocarbon is then distilled to remove water formed in the reaction as an azeotrope according to the following reaction:

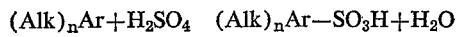

In the second stage, $P_2O_5$ is added in small, catalytic quantities, less than the stoichiometric amount. Generally, this amount of $P_2O_5$ will be employed in an amount such as to produce a molar ratio to sulfonic acid within the range of 0.001:1 to 0.75:1, preferably 0.01:1 to 0.5:1.

Such small catalytic quantities of $P_2O_5$ act merely as a catalyst to initiate the reaction and water thereafter may be continuously distilled off azeotropically as it is formed, thus maintaining the phosphoric acid concentrated. The $P_2O_5$ forms phosphoric acid which is maintained concentrated by the azeotropic distillation as the reaction progresses and is finally easily separated from the sulfone formed. The reaction is as follows:

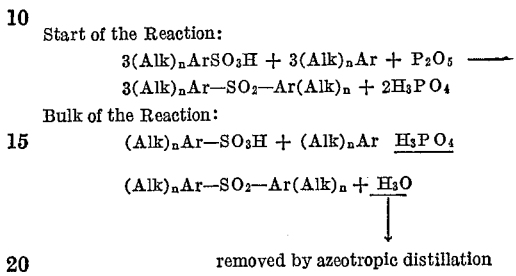

The sulfone formation is thus merely catalyzed by using a small amount of phosphoric acid, water being distilled off as it is initially formed. Consequently, only a small amount of $P_2O_5$ need be used, in quantity only sufficient to initiate the reaction, with removal of the water by distillation, a most economic operation.

It is economically desirable, as pointed out below, to use an excess of the unsulfonated hydrocarbon to obtain maximum yield. That excess of hydrocarbon, if it boils at a reasonable temperature, such as below about 200° C., can also serve as a convenient refluxing and water entraining solvent, operative to remove water as the reaction progresses. That is, the excess aromatic hydrocarbon, besides reacting to form the dialkaryl sulfone as a reaction component, also acts as a refluxing solvent and water entraining agent. However, where the alkyl aromatic hydrocarbon boils too high, such as in the case of the polycyclic alkaryl hydrocarbons, it is prfeerred to add an inert paraffinic or cycloparaffinic hydrocarbon refluxing and entraining agent to the reaction for purposes of acting as the water entraining agent. Such inert hydrocarbon may be any volatile paraffinic hydrocarbon boiling between about 50° C. and 200° C.; typically ranging from about hexane through dodecane; that is, about 6 to 12 carbon atoms, and may include saturated acyclic as well as naphthenes such as hexane, octane, decane, tetraisopropane, cyclohexane, methylcyclohexane and the like as a refluxing and water entraining solvent.

While unsubstituted phenyl, for instance, diphenyl sulfone, does react in reasonable yields by the present method, the alkaryl sulfones wherein the aryl radical includes an alkyl substituent as defined above reacts in better yields and therefore is preferred.

The diphenyl sulfone is a common article of commerce. The dialkaryl sulfones are useful intermediates in the formation of carboxylic acids, therefrom; for instance, the alkyl groups can be oxidized in liquid or vapor phase, for instance, catalytically with $O_2$ or with nitric acid to form the carboxy groups. The polycarboxy-substituted diaryl sulfones form quite stable polymers of the poly-ester or polyamide type. For instance, these polymers are usefully spun into fiber or dissolved in solvents and converted to sheet form; or they may be merely extruded to various useful polymeric shapes.

The preferred dialkaryl sulfones are symmetrical alkylbenzene sulfone compounds linking two of the same alkylbenzenes each having 1 or 2 lower alkyl groups such as toluene, xylene, ethyl or diethyl benzenes. However, it is easily possible, since the reaction runs in two stages, first to convert an alkylbenzene compound to a sulfonic acid and then to use a different alkylbenzene hydrocarbon for the second stage, whereby the ultimate sulfone has one alkylbenzene radical as used in the initial sulfonation reaction; and a second and different alkylbenzene radical as used in the second stage, thus to form unsymmetrical alkylbenzene sulfones.

The reaction is run by first treating the alkyl aryl hydrocarbon with strong sulfuric acid using 80 to 100%, preferably 90 to 100% sulfuric acid usually with an excess of the alkylbenzene compound so that the reaction product can be heated merely to drive off the water formed together with the excess hydrocarbon azeotropically. Thereafter the dry bottoms solution of alkaryl sulfonic acid has added thereto, usually at any moderate temperature or even cold ambient temperature, a small catalytic quantity of $P_2O_5$, only sufficient to initiate sulfone formation. The excess alkylbenzene compound is then distilled off, together with the water as formed, leaving a solution of phosphoric acid and the dialkaryl sulfone together with some unreacted alkaryl sulfonic acid. The reaction mixture is washed to separate the dialkaryl sulfone which is then dried and crystallized to pure form.

The following examples illustrate the practice of this invention:

EXAMPLE I

To a 500 ml. three-necked flask equipped with stirrer and reflux head, was added 49 grams (0.5 mol) of sulfuric acid and 265 grams (2.5 mols) of orthoxylene. The mixture was stirred and heated until water started condensing overhead. The water was distilled off slowly with some orthoxylene. Nine grams of water and 151 grams of orthoxylene were recovered overhead. The bottoms solution of sulfonic acid and excess orthoxylene was cooled. One gram of $P_2O_5$ was added to the cooled solution. It was then heated and stirred for two hours with xylene refluxing. The excess o-xylene was then distilled overhead leaving a solution of o-xylyl sulfonic acid, phosphoric acid and 3,3′,4,4′-tetramethyldiphenyl sulfone. This solution was poured into a liter of water. A light tan precipitate separated. It was filtered, washed with $NH_4OH$ and dried. Forty-one grams of light tan crystals were recovered. Recrystallization from ethanol gave white crystals of 3,3′,4,4′-tetramethyldiphenyl sulfone with a melt point of 161° C. (literature value—162° C.), and a sulfur content of 11.2% (theory—11.7%). The yield was 30%, based on sulfuric acid charged.

EXAMPLE II 50.7 grams (0.5 mol) 96.6% sulfuric acid and 159 grams (1.5 mols) paraxylene were charged to the apparatus as described in Example I. 9 ml. of water and 61 ml. of paraxylene were distilled over. The xylene sulfonic acid in paraxylene solution was cooled and the 61 ml. overhead paraxylene were returned to the reaction mixture. Four grams of phosphorous pentoxide were added and refluxed for one hour. The medium was cooled and four more grams of $P_2O_5$ were added. The medium was refluxed and slowly 61 ml. of paraxylene were distilled over along with about one ml. of water. The reaction mixture was poured into a liter of water. A gray precipitate of 2,5,2′,5′-tetramethyl diphenyl sulfone separated. The crystals were washed with ammonium hydroxide and methanol. 27 grams of crystals were recovered. The crystals had a melting point of 144° C. (literature value—144° C.) and a sulfur content of 12.4% (theory—11.7%). The yield was 19.7% based on sulfuric acid.

The procedure as described in Example I is repeated, alternately substituting alphamethyl naphthalene, toluene, ethylbenzene, 1,8-dimethyl tetraline, 1-methyl anthracene and mixed isomeric ortho-, meta- and para-xylenes. In each case a heavy tan residue of dialkaryl sulfone is obtained, readily crystallizable from alcohol to white crystals.

What is claimed is:
1. The method of forming di(alkaryl) sulfones having the formula

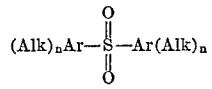

wherein Alk is a lower alkyl having 1 to 6 carbon atoms, Ar is an aryl radical selected from the group consisting of benzene, biphenyl, naphthalene, Tetralin, anthracene, benzophenone, diphenyl methane, phenanthrene and biphenylene oxide, and $n$ is 0 to 3, comprising sulfonating an alkaryl compound of the formula $(Alk)_nAr$ with strong sulfuric acid to form a sulfonic acid compound having the formula $(Alk)_nArSO_3H$, and then adding to said sulfonic acid compound more alkaryl of the formula $(Alk)_nAr$ together with a small reaction initiating quantity of $P_2O_5$, substantially less than the stoichiometric quantity of water evolved in said reaction and then distilling the said reaction components in the presence of a water-entraining hydrocarbon vaporizable below about 200° C. and inert to phosphoric acid as the reaction progresses to remove water.

2. The method as defined in claim 1 wherein the phosphoric acid is added to the reaction mixture in the form of $P_2O_5$ in quantity to supply a molar ratio to sulfonic acid in the range of .001:1 to 0.75:1.

3. The method as defined in claim 1 wherein the entraining agent is derived from unreacted excess aromatic hydrocarbon.

4. The method as defined in claim 1 wherein the entraining agent is derived from added inert paraffinic or cycloparaffinic hydrocarbon boiling in the range of about 50° C. to 200° C.

5. The method as defined in claim 1 wherein the $(Alk)_nAr$ radicals are derived from an alkyl benzene having 1 to 3 alkyl groups, each alkyl group having from 1 to 6 carbon atoms.

6. The method as defined in claim 5 wherein the di[$(Alk)_n$phenyl] sulfone compound is a symmetrical di[$(Alk)_n$phenyl] sulfone formed by reacting the first stage alkaryl sulfonic acid reaction product with the same alkylbenzene as the alkylbenzene from which the alkylbenzene sulfonic acid was initially formed.

7. The method as defined in claim 5 wherein the di[$(Alk)_n$phenyl] sulfone is unsymmetrical, the sulfone radical being bonded to different alkylbenzene structures.

8. The method as defined in claim 1 wherein the alkylbenzene starting material is ortho-xylene and the alkaryl sulfone formed is bis(3,4-dimethylphenyl) sulfone.

9. The method as defined in claim 1 wherein the alkylbenzene starting material is meta-xylene and the alkaryl sulfone formed is bis(2,4-dimethylphenyl) sulfone.

10. The method as defined in claim 1 wherein the starting material is ortho-xylene from which 1,2-dimethyl-4-phenyl sulfonic acid is formed as the first stage reaction product, and the 1,2-dimethyl-4-sulfonic acid reaction product is converted by reaction with meta-xylene in the presence of a catalytic amount of phosphoric acid to (3,4-dimethylphenyl), (2′,4′-dimethylphenyl) sulfone.

11. The method of claim 1 wherein at least one of the Ar radicals is derived from benzene.

12. The method as defined in claim 1 wherein the alkaryl radicals of the sulfone are each derived from toluene.

13. The method as defined in claim 1 wherein the alkaryl radicals of the sulfone are each derived from ethylbenzene.

14. The method as defined in claim 1 wherein the alkaryl radicals of the sulfone are each derived from xylene.

15. The method as defined in claim 1 wherein the alkaryl radicals of the sulfone are each derived from diethylbenzene.

16. The method as defined in claim 1 wherein the alkaryl radicals of the sulfone are each derived from a mixture of ortho-, meta- and para-xylene isomers.

17. The method of forming bis diorthoxylyl sulfone comprising first reacting ortho-xylene with strong sulfuric acid to form 3,4-dimethyl sulfonic acid and then reacting the 3,4-dimethyl sulfonic acid with an excess of ortho-xylene in the presence of a small reaction initiating quantity of $P_2O_5$ to supply a molar ratio to sulfonic acid in the range of 0.01:1 to 0.5:1 insufficient to bind all of the water of the reaction as phosphoric acid, and completing the reaction by heating the reaction mixture to evaporate the water as formed in azeotrope of the excess of ortho-xylene.

References Cited
UNITED STATES PATENTS

| | | | |
|---|---|---|---|
| 2,833,826 | 5/1958 | Jarboe | 260—607 A |
| 2,556,429 | 6/1951 | Lee | 260—607 A |
| 3,501,532 | 3/1970 | Minor et al. | 260—607 A |

LEWIS GOTTS, Primary Examiner

D. R. PHILLIPS, Assistant Examiner

U.S. Cl. X.R.

260—590, 505 A